(12) United States Patent
Das et al.

(10) Patent No.: US 10,462,828 B2
(45) Date of Patent: Oct. 29, 2019

(54) POLICY AND BILLING SERVICES IN A CLOUD-BASED ACCESS SOLUTION FOR ENTERPRISE DEPLOYMENTS

(71) Applicant: FEDERATED WIRELESS, INC., Arlington, VA (US)

(72) Inventors: Deepak Das, Lexington, MA (US); Sepehr Mehrabanzad, Wellesley, MA (US)

(73) Assignee: Federated Wireless, Inc., Arlington, VA (US)

( * ) Notice: Subject to any disclaimer, the term of this patent is extended or adjusted under 35 U.S.C. 154(b) by 0 days.

(21) Appl. No.: 16/017,594

(22) Filed: Jun. 25, 2018

(65) Prior Publication Data

US 2018/0310347 A1    Oct. 25, 2018

Related U.S. Application Data

(63) Continuation of application No. 15/150,364, filed on May 9, 2016, now Pat. No. 10,028,317.

(Continued)

(51) Int. Cl.
*H04W 76/10* (2018.01)
*H04L 29/08* (2006.01)
(Continued)

(52) U.S. Cl.
CPC ........ *H04W 76/10* (2018.02); *H04B 7/18523* (2013.01); *H04L 12/14* (2013.01); *H04L 12/66* (2013.01); *H04L 41/5051* (2013.01); *H04L 49/70* (2013.01); *H04L 67/02* (2013.01); *H04L 67/10* (2013.01); *H04L 67/142* (2013.01); *H04L 67/22* (2013.01); *H04M 15/55* (2013.01);
(Continued)

(58) Field of Classification Search
CPC .............................. H04W 76/10; H04W 76/27
See application file for complete search history.

(56) References Cited

U.S. PATENT DOCUMENTS

2013/0132585 A1    5/2013  Raleigh et al.
2014/0259012 A1    9/2014  Nandlall et al.
(Continued)

*Primary Examiner* — Diane D Mizrahi
(74) *Attorney, Agent, or Firm* — Finnegan, Henderson, Farabow, Garrett & Dunner LLP

(57) ABSTRACT

Systems and methods for providing mobile services are disclosed. In one implementation, an access point (AP) is provided, which may include a set of one or more base-station functions for use by a user equipment (UE) connected to the AP over a wireless communication interface. The one or more base-station functions may be configured to receive information from the UE. The AP may further include a set of one or more core-network functions configured to receive the information from the set of one or more base-station functions and a distributed portion of a service. The distributed portion of the service may be configured to receive the information from the one or more core-network functions and communicate the information to a corresponding cloud portion of the service running on a cloud platform. The service may be provided by a combination of the distributed portion and the cloud portion of the service. The distributed portion of the service may be further configured to receive a response from the cloud portion of the service based on processing performed by the cloud portion on the cloud platform.

21 Claims, 11 Drawing Sheets

Related U.S. Application Data

(60) Provisional application No. 62/158,959, filed on May 8, 2015, provisional application No. 62/163,624, filed on May 19, 2015, provisional application No. 62/163,743, filed on May 19, 2015, provisional application No. 62/164,949, filed on May 21, 2015, provisional application No. 62/165,018, filed on May 21, 2015.

(51) Int. Cl.
| | |
|---|---|
| *H04W 12/06* | (2009.01) |
| *H04W 76/27* | (2018.01) |
| *H04W 48/06* | (2009.01) |
| *H04W 48/16* | (2009.01) |
| *H04L 12/66* | (2006.01) |
| *H04L 12/931* | (2013.01) |
| *H04M 15/00* | (2006.01) |
| *H04W 4/24* | (2018.01) |
| *H04B 7/185* | (2006.01) |
| *H04W 56/00* | (2009.01) |
| *H04L 12/24* | (2006.01) |
| *H04W 12/08* | (2009.01) |
| *H04W 4/60* | (2018.01) |
| *H04L 12/14* | (2006.01) |
| *H04W 88/08* | (2009.01) |
| *H04W 84/20* | (2009.01) |
| *H04L 29/12* | (2006.01) |

(52) U.S. Cl.
CPC .............. *H04M 15/66* (2013.01); *H04W 4/24* (2013.01); *H04W 4/60* (2018.02); *H04W 12/06* (2013.01); *H04W 12/08* (2013.01); *H04W 48/06* (2013.01); *H04W 48/16* (2013.01); *H04W 56/0015* (2013.01); *H04W 76/27* (2018.02); *H04L 41/5087* (2013.01); *H04L 41/5096* (2013.01); *H04L 61/1505* (2013.01); *H04W 84/20* (2013.01); *H04W 88/08* (2013.01)

(56) References Cited

U.S. PATENT DOCUMENTS

| | | | |
|---|---|---|---|
| 2015/0063166 A1* | 3/2015 | Sif | G06F 9/45558 370/254 |
| 2015/0230126 A1 | 8/2015 | Raleigh et al. | |
| 2016/0330749 A1 | 11/2016 | Mehrabanzad et al. | |
| 2017/0201850 A1 | 7/2017 | Raleigh et al. | |
| 2018/0343567 A1* | 11/2018 | Ashrafi | H04L 67/10 |

\* cited by examiner

POLICY AND BILLING SERVICES IN A CLOUD-BASED ACCESS SOLUTION FOR ENTERPRISE DEPLOYMENTS

CROSS-REFERENCE TO RELATED APPLICATIONS

This application is a continuation of U.S. application Ser. No. 15/150,364, filed May 9, 2016, which claims the benefits of U.S. Provisional Application Ser. No. 62/158,959, filed May 8, 2015, U.S. Provisional Application Ser. No. 62/163,624, filed May 19, 2015, U.S. Provisional Application Ser. No. 62/163,743, filed May 19, 2015, U.S. Provisional Application Ser. No. 62/164,949, filed May 21, 2015, and U.S. Provisional Application Ser. No. 62/165,018, filed May 21, 2015, which are each hereby incorporated by reference in their entireties. This application also relates to co-pending U.S. application Ser. No. 15/150,374, filed May 9, 2016, also hereby incorporated by reference in its entirety.

FIELD OF INVENTION

The present invention relates to a wireless access infrastructure and, more particularly, to a novel cloud-based wireless access solution that can be integrated with enterprise deployments.

BACKGROUND

A conventional wireless access infrastructure includes a radio access network and a core network typically owned, managed, and controlled by a single wireless service provider called the wireless carrier. The radio access network, such as the Evolved Universal Terrestrial Radio Access (E-UTRA) defined in 3GPP's Long Term Evolution (LTE) standard, contains the network and equipment for connecting user equipment (UE), such as mobile devices and computers having wireless connectivity, to the core network. The core network, such as the Evolved Packet Core (EPC) defined in the LTE standard, contains the network and equipment for providing mobile voice and data services within the carrier's service environment and to external networks, such as the Internet, and other carriers' networks.

The LTE standard, for example, defines specific network nodes and communication interfaces for implementing the E-UTRA and EPC. According to the standard, the E-UTRAN includes one or more eNodeB (base stations) configured to communicate with UEs and the EPC core network. The EPC includes at least a Mobility Management Entity (MME), which manages session states, authentication, paging, and mobility and roaming functions; a packet-data gateway (PGW), which sends/receives data packets to/from an external data network, such as the Internet; a Serving Gateway (SG-W), which routes data packets between the PGW and an eNodeB; and a Policy and Charging Rules Function (PCRF), which manages users, applications, and network resources based on carrier-configured rules.

FIG. 1 is a schematic block diagram of an exemplary LTE wireless access infrastructure 1000 including an E-UTRAN 1100 and an EPC 1200. The E-UTRAN 1100 includes at least one eNodeB 1102 configured to communicate with UEs 1002A and 1002B over wireless links. The EPC 1200 contains network nodes including a MME 1202, SG-W 1204, PGW 1206, and PCRF 1208. While the exemplary infrastructure 1000 is depicted with only one PGW 1206 connected to an external packet-data network, such as the Internet, the EPC 1200 alternatively may contain multiple PGWs, each connecting the EPC 1200 to a different packet data network. The MME 1202, SG-W 1204, PGW 1206, and PCRF 1208 are implemented in software on dedicated hardware (computers) 1302, 1304, 1306, and 1308. The dedicated hardware may be a single server or a cluster of servers. The LTE network nodes 1202, 1204, 1206, and 1208 are typically implemented as monolithic software modules that execute on their respective dedicated hardware 1302, 1304, 1306, and 1308.

The LTE standard not only defines functionalities in each of the MME 1202, SG-W 1204, PGW 1206, and PCRF 1208, but also defines the communication interfaces between them. The LTE standard defines several interfaces including, for example, an "S1-MME" interface between the eNodeB 1102 and the MME 1202, an "S1-U" interface between the eNodeB 1102 and the SG-W 1204, an "S11" is an interface between the MME 1202 and the SG-W 1204, an "S5" interface between the SG-W 1204 and the PGW 1206, and a "Gx" interface between the PCRF 1208 and the PGW 1206. The exemplary infrastructure 1100 illustrates these standardized interfaces.

Because the communication interfaces and network nodes in the LTE wireless access infrastructure 1000 are standardized, they ensure compatibility between the MME 1202, SG-W 1204, PGW 1206, and PCRF 1208, even when those nodes are programmed and/or developed by different manufacturers. Such standardization also ensures backward compatibility with legacy versions of any nodes that may have been previously deployed in the infrastructure 1000.

The need for multiple, dedicated network nodes makes deployment of an LTE wireless access infrastructure, such as the exemplary infrastructure 1000, costly and complex. Specifically, IP-centric enterprise solutions with typical web-based interfaces and protocols do not generally work seamlessly with the 3GPP-based standardized functions and interfaces. For example, the interfaces of a typical Cloud-based service in the enterprise say, based on HTTPS are not easy to connect to 3GPP nodes with standardized interfaces such as S1 over SCTP. The standardized nodes and interfaces in conventional wireless access infrastructures also make scaling the infrastructure challenging. For example, it may be difficult to deploy only a subset of the functions and/or communication interfaces defined by the standard. Furthermore, conventional wireless access infrastructures may not utilize resources efficiently within the infrastructure. In some conventional wireless access solutions, for example, a UE may be denied voice and/or data services because one of the network nodes is unable to handle an additional user even though other nodes are not being fully utilized. In other words, the capacity of the conventional infrastructure may be limited by the capacity of each node.

SUMMARY

The invention provides a novel cloud-based wireless access system and method using services. The disclosed embodiments of the invention may be configured to provide one or more functions of a conventional wireless access infrastructure, such as an E-UTRA radio access network and/or EPC core network defined in the LTE standard. The functions provided by the services may include, for example, an authentication function, a policy function, and a location function, among others, which in the past would have been implemented by executing monolithic applications on dedicated hardware (e.g., MME, SG-W, PGW, and PCRF) via standardized interfaces (e.g., S11 and S1-MME).

Each service may include both a cloud portion and a distributed portion, whereby the cloud portion may communicate with its corresponding distributed portion using known cloud interfaces and protocols, such as HTTPS/TLS. As a result, the disclosed embodiments may use less hardware, fewer interfaces, and are more configurable than prior wireless access infrastructures.

An access point (AP) may be used to provide wireless network access to one or more UEs in an enterprise network in accordance with the disclosed embodiments. To that end, the AP may provide a set of one or more eNodeB functions and a set of one or more EPC functions for each UE in communication with the AP. In some embodiments, the one or more eNodeB functions may be configured to receive information from the UE and pass that information to the one or more EPC functions allocated for the UE. The AP may include a distributed portion of a service configured to receive the information from the one or more EPC functions and communicate the information to a corresponding cloud portion of the service running on a cloud platform. The cloud portion of the service on the cloud platform may return response information to its distributed portion on the AP. For example, the cloud portion of the service may communicate with a server or service implementing at least one billing or policy function, and based on information it receives from such a policy or billing source, the cloud portion of the service may send response information to its distribution portion. In the case of a policy service, for example, the cloud portion of the service may send at least one policy rule to the distributed portion, which may provide the policy rule to one or more EPC functions for further processing. Additionally, the cloud portion of the service may cause a network device (such as a network router or switch) to be configured in a software-defined networking architecture based on the policy rule. In the case of a billing service, for example, the cloud portion of the service may forward charging-related configuration information to its corresponding distributed portion of the service, which in turn may provide the charging-related configuration information to one or more EPC functions that may use the configuration information, e.g., to measure network usage.

In accordance with some of the disclosed embodiments, a method performed by an AP executing a set of one or more base-station functions for use by a UE, a set of one or more core-network functions, and a distributed portion of a service, may include: receiving, by the set of one or more base-station functions, information from the UE; receiving, by the set of one or more core-network functions, the information from the set of one or more base-station functions; receiving, by the distributed portion of the service, the information from the one or more core-network functions; communicating the information to a corresponding cloud portion of the service running on a cloud platform, wherein the service is provided by a combination of the distributed portion and the cloud portion of the service; and receiving a response from the cloud portion of the service based on processing performed by the cloud portion on the cloud platform. Persons of ordinary skill in the art will appreciate that the cloud-based wireless access infrastructure disclosed herein may contain other distributed and cloud portions of services, in addition to or in place of the exemplary policy and billing services described in the illustrative embodiments below.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION OF DISCLOSED EMBODIMENTS

Figure 1:
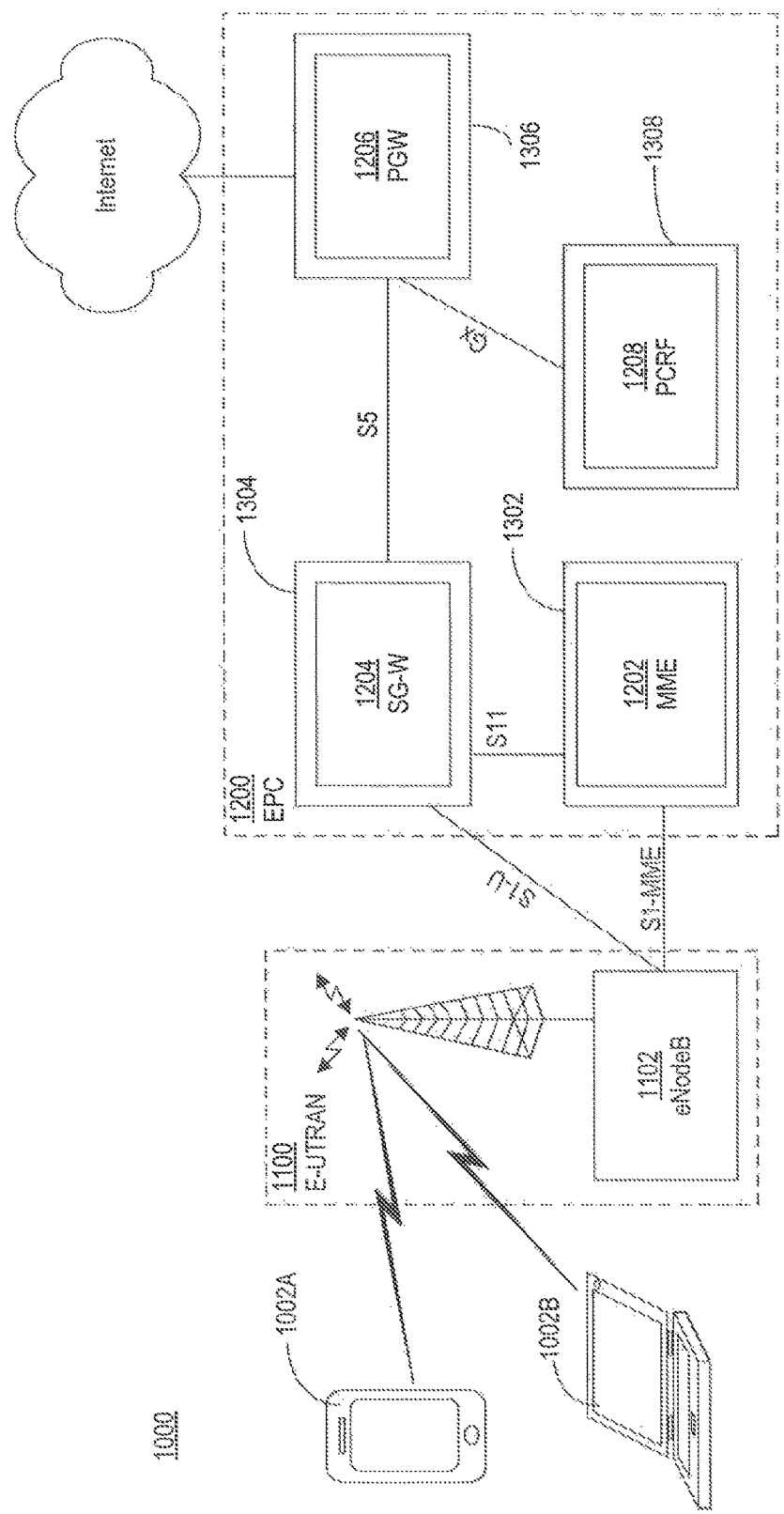
FIG. 1 is a schematic block diagram of an example conventional LTE wireless infrastructure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the nodes and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Figure 2:
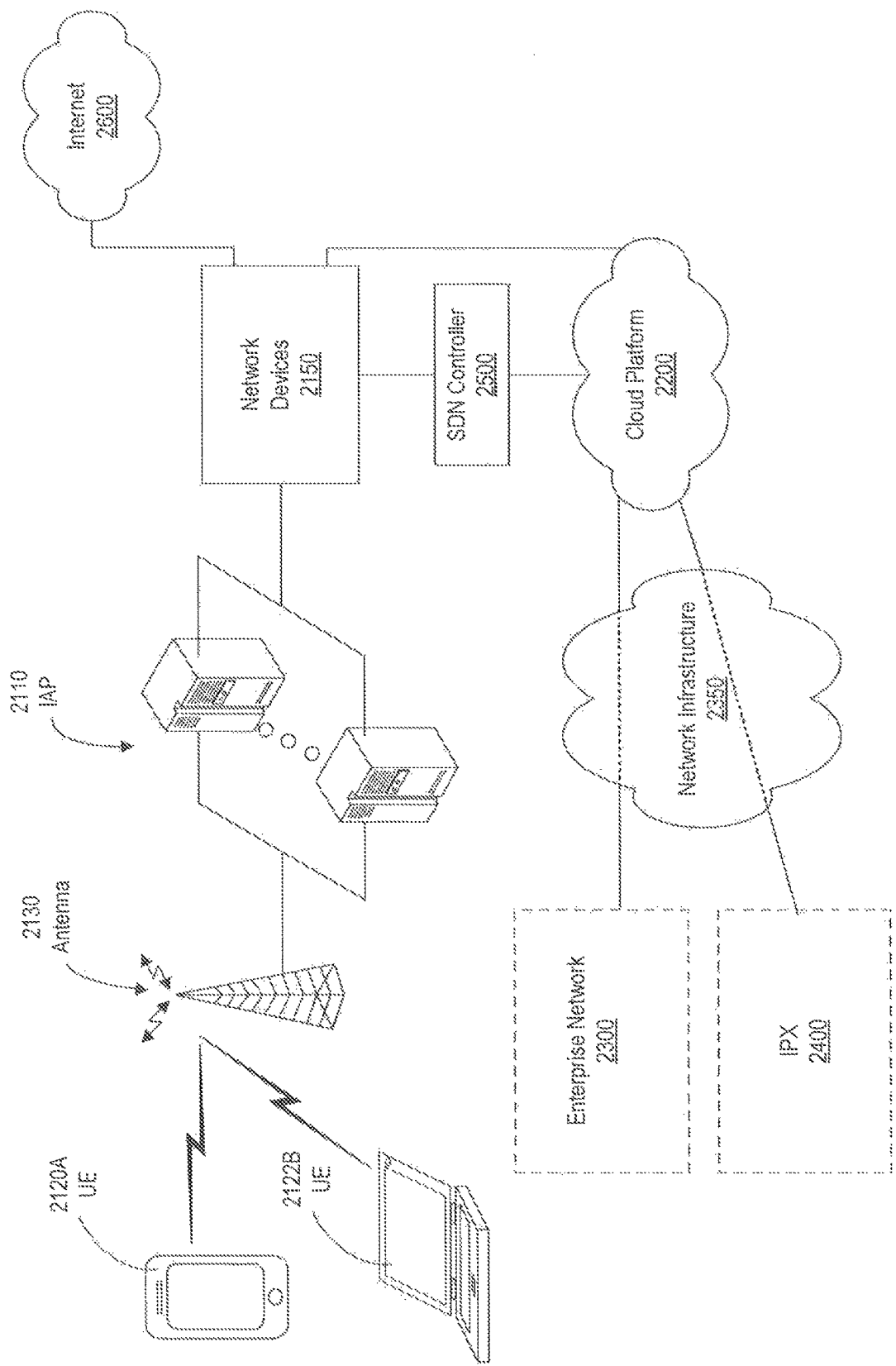
FIG. 2 illustrates a schematic block diagram of an exemplary cloud-based wireless access infrastructure in accordance with the disclosed embodiments.

FIG. 2 illustrates a block diagram of an exemplary cloud-based wireless access infrastructure 2000 in accordance with the disclosed embodiments of the invention. The exemplary cloud-based wireless access infrastructure 2000 may provide one or more access points (AP) 2110 through which users may communicate to access standardized wireless voice and/or data services, such as defined in the LTE standard, as well as enterprise-level applications and services that would be available to the user in an enterprise network of a corporate, governmental, academic, non-profit, or other organization or entity. For example, in accordance with the disclosed embodiments, an organization may deploy an AP 2110 in a building to provide its employees in that building with wireless access to both LTE and enterprise-level services.

The exemplary cloud-based wireless access infrastructure 2000 includes at least first and second UEs 2120A-B, one or more antennas 2130, one or more APs 2110, one or more network devices 2150, a network controller 2500, a cloud platform 2200, an enterprise network 2300, and an internet protocol exchange (IPX) 2400.

As shown in FIG. 2, each of the UEs 2120A-B may communicate with the AP 2110 through the antenna 2130 electrically coupled to the AP 2110. While a single antenna is shown in FIG. 2, the cloud-based wireless access infrastructure 2000 may alternatively employ multiple antennas, each electrically coupled to the AP 2110. In some embodiments, one or more antennas 2130 may connect to the AP 2110 and other antennas may connect to different APs in the same wireless access infrastructure. The AP 2110 may be implemented on one or more computer systems. The AP 2110, for example, may execute one or more software programs on a single computer or on a cluster of computers. Alternatively, the AP 2110 may be implemented as one or more software programs executing on one or more virtual computers.

In the disclosed embodiments, the AP 2110 may be connected to one or more network devices 2150, which may be configured to forward data between the UEs 2120A-B (via the AP 2110) and external data networks, such as the Internet 2600 and/or the cloud platform 2200. The network devices 2150 may include, for example, a hub, switch, router, virtual switches/router, distributed virtual switch (vSwitch), DHCP server, encrypted tunnel end-point manager and/or any combination thereof.

In some embodiments, at least a subset of the network devices 2150 may be dynamically configured by a software-defined networking (SDN) controller. For example, as shown in FIG. 2, a SDN controller 2500 may configure one or more layer-two devices (e.g., switches) or layer-three devices (e.g., routers) in the set of network devices 2150, such that data packets or frames may be routed, processed, and/or blocked at the network devices based on various parameters, such as, but not limited to, the origin or destination of the data, type of data, and/or carrier or enterprise policies. Additionally, or alternatively, the SDN controller 2500 may configure at least a subset of the network devices 2150 to provide different qualities of service (QoS) to different UEs based on one or more policies associated with each UE. For example, the SDN controller 2500 may configure the one or more network devices 2150 to ensure that the UE 2120A, which may be associated with a business customer, receives a higher QoS compared with the UE 2120B, which may be associated with a non-business customer.

In some embodiments, the SDN controller 2500 may configure one or more of the network devices 2150 based on data (including, for example, messages, notifications, instructions, measurements, authorizations, approvals, or other information) received from one or more services running in the cloud-based wireless access infrastructure 2000. For example, the SDN controller 2500 may receive instructions on how and which of the network devices 2150 to configure from a service on the cloud platform 2200.

In accordance with the disclosed embodiments, the cloud platform 2200 may communicate with the enterprise network 2300 and/or the IPX 2400. In some embodiments, the cloud platform 2200 may include direct connections to the enterprise network 2300, as shown in FIG. 2. Alternatively, the cloud platform 2200 may employ indirect connections (not shown in the figures), such as using the Internet 2600 (via the network device 2150), to communicate with the enterprise network 2300. For example, the cloud platform 2200 may communicate with the enterprise network 2300 through the Internet 2600 using a tunneling protocol or technology, such as the IPSec protocol, or may communicate with an LTE EPC 1200 node of another carrier via the IPX 2400 using one or more standardized interfaces, such as the Gy, Gz, Gx, and S6a interfaces as defined in the LTE standard. In FIG. 2, the enterprise network 2300 is shown to be separate, but electrically coupled, with the cloud platform 2200. In other embodiments (not shown), however, the enterprise network 2300 may be implemented on the cloud platform 2200.

Figure 3:
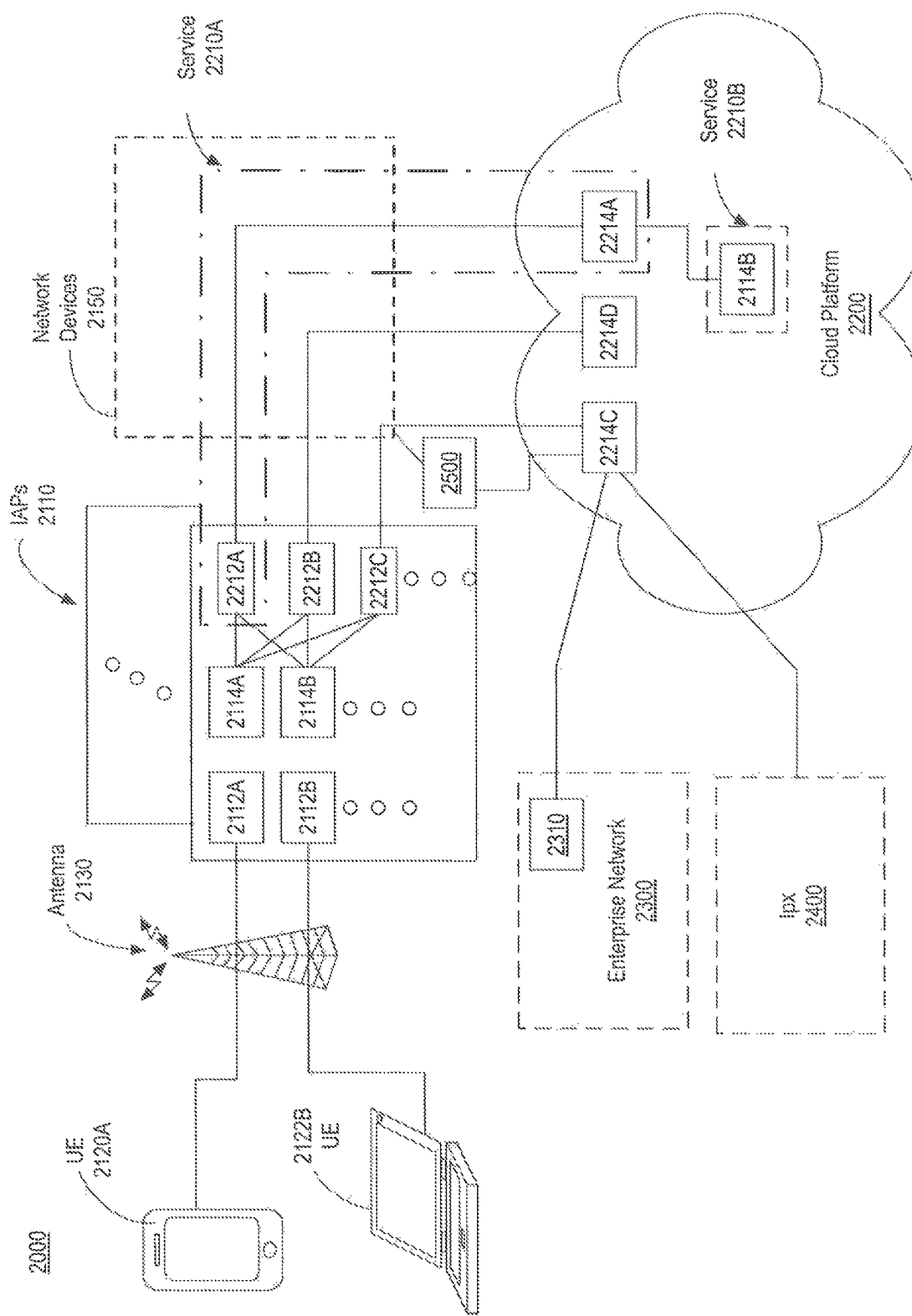
FIG. 3 illustrates a schematic block diagram of the exemplary cloud-based wireless access infrastructure of FIG. 2 showing additional implementation details in accordance with the disclosed embodiments.

FIG. 3 illustrates another illustrative block diagram of the exemplary cloud-based wireless access infrastructure 2000 of FIG. 2 in accordance with the disclosed embodiments. FIG. 3 illustrates additional implementation details of the AP 2110, cloud platform 2200, and enterprise network 2300 that may be used in the exemplary cloud-based wireless access infrastructure 2000.

As shown in FIG. 3, the AP 2110 may be configured to execute one or more instances of a software program configured to implement functions of a base station and one or more instances of a software program configured to implement functions of a core network. For example, in FIG. 3, eNodeB Functions 2112A-B represent at least two instances of a software program configured to provide at least a subset of functions of an LTE base station, such as the eNodeB 1102. Similarly, EPC Functions 2114A-B represent at least two instances of a software program configured to provide at least a subset of functions of an LTE core network, such as the EPC 1200. In some embodiments, the AP 2110 may be configured to execute one or more instances of a single software program configured to implement both the eNodeB Functions and EPC Functions.

In some embodiments, a fixed number of instances of eNodeB Function 2112A-B and a fixed number of instances of EPC Function 2114A-B may be instantiated and maintained in the AP 2110. The number of instances of the eNodeB Functions 2112A-B and the number of instances of the EPC Functions 2114A-B may be the same or different. In some embodiments, when a UE 2120A wirelessly connects to the AP 2110, an existing instance of eNodeB Function 2112A and an existing instance of EPC Function 2114A may be assigned to handle communications with the UE 2120A. In other embodiments (e.g., when existing instances of eNodeB Function 2112A and EPC Function 2114A are unavailable to assign to the UE 2120A), the AP 2110 may instantiate a new instance of an eNodeB Function and a new instance of an EPC Function for the UE 2120A. In alternative embodiments, the AP 2110 may dynamically instantiate and assign a new instance of eNodeB Functions and a new instance of EPC Functions for each UE.

According to the disclosed embodiments, an instance of the eNodeB Functions 2112A may be configured to provide all radio-related functions needed to send/receive data to/from a UE 2120A. For example, an instance of eNodeB Function 2112A may perform at least a subset of functions of an eNodeB as defined in the LTE standard including, but not limited to, functions of a physical (PHY) layer, media access control (MAC) layer, radio resource management (RRM), and/or self-organizing network (SON). Functions of a PHY layer (as defined in the LTE standard) may include, for example, channel coding, rate matching, scrambling, modulation mapping, layer mapping, pre-coding, resource mapping, orthogonal frequency-division multiplexing (ODFM), and/or cyclic redundancy checking (CRC). Functions of MAC layer (as defined in the LTE standard) may include, for example, scheduling, multiplexing, and/or hybrid automatic repeat request (HARQ) operations. Functions of RRM (as defined in the LTE standard) may include, for example, allocating, modifying, and releasing resources for transmission over the radio interface between a UE 2120A and the AP 2110. Functions of a SON (as defined in the LTE standard) may include, for example, functions to self-configure, self-optimize, and self-heal the network devices 2150. Alternatively, or additionally, an instance of eNodeB Function 2112A may perform at least a subset of functions of an element equivalent to an eNodeB in other wireless standards, such as, but not limited to, functions of a base transceiver station (BTS) as defined in the GSM/EDGE standard or a NodeB as defined in the UMTS/HSPA standard. In some embodiments, a UE 2120A may wirelessly connect to the AP 2110 in the 3.5 GHz shared band.

According to the disclosed embodiments, an instance of eNodeB Function 2112A may be further configured to send/receive data to/from a corresponding instance of EPC Function 2114A. However, in contrast with the conventional wireless access infrastructure 1000 of FIG. 1 that only uses standardized communication interfaces, an instance of the eNodeB Function 2112A in the AP 2110 may communicate with an instance of the EPC Function 2114A also executing in the AP 2110 using any interface or protocol. Because the eNodeB and EPC Functions execute on the same AP 2110, they do not need to be constrained to standardized communication interfaces. Instances of eNodeB Functions 2112A and EPC Functions 2114A may communicate with one another using, among other things, language-level method or procedure calls, remote-procedure call (RPC), Simple Object Access Protocol (SOAP), or Representational State Transfer (REST).

In accordance with the disclosed embodiments, an instance of the EPC Functions 2114A may be configured to provide at least some functions of a core network. For example, the exemplary instance of EPC Function 2114A may include functions such as, but not limited to, at least a subset of functions of the MME 1202, PGW 1206, SG-W 1204, and/or PCRF 1208 of EPC 1200 as defined in the LTE standard. An instance of the EPC Function 2114A, for example, may include a Mobility Management Function (MMF) which may perform at least a subset of functions of the MME 1202 (e.g., authentication functions) and the Optimized Packet Function (OPF) which may perform at least a subset of functions of the SG-W 1204 node and/or the PGW 1206 node (e.g., forwarding packets between the UE 2120A and one or more external data networks, such as the Internet 2600 and IPX 2400 via the appropriate Cloud service).

In contrast with the MME 1202 node defined in the LTE standard, the MMF executing in the AP 2110 may communicate with the OPF using any protocol because both functions are implemented in the same EPC Function 2114A. On the other hand, in the EPC 1200, the MME 1202 node is connected to the SG-W 1204 using the standardized interface S 1I and the SG-W 1204 is connected to the PGW node using the standardized interfaces S5/S8. In the disclosed embodiments, for example, the MME 1202 and the OPF node may communicate with one another using language-level methods or procedure calls, RPC, SOAP, or HTTP/REST.

Advantageously, an instance of eNodeB Function 2112A and/or EPC Function 2114A may implement the functions (or a subset of functions) of the eNodeB 1102 and/or the EPC 1200 using one or more services in accordance with the disclosed embodiments. For example, a service 2210A may include a distributed portion 2212A and a cloud portion 2214A. The distributed portion 2212A may be implemented within the AP 2110 and may provide application programming interfaces (APIs) that may be accessible by instances of eNodeB Functions 2112A-B and/or EPC Functions 2114A-B. The cloud portion 2214A of the service 2210A may be utilized by instances of the eNodeB Functions 2112A-B and/or EPC Functions 2114A-B through the associated distributed portion 2212A running on the AP 2110.

Unlike the conventional wireless access infrastructure 1000, the exemplary cloud-based wireless access infrastructure 2000 may utilize available resources more efficiently, in part, because the services (e.g., 2110 A-B) share the same pool of cloud-platform resources, and further, the cloud platform 2200 may dynamically reallocate resources to and from each service based on the service's resource needs. For example, in the cloud-based wireless access infrastructure 2000, the cloud platform 2200 may dynamically allocate computing resources, such as memory and CPU time, to various services based on each service's real-time demand for such resources. In contrast, a predetermined amount of resources would be dedicated to each node in the conventional wireless access infrastructure 1000, and these resources cannot be distributed among the other nodes dynamically. Therefore, situations may exist in the conventional wireless access infrastructure 1000 where the UE 1002A is denied service because one of the nodes (e.g., the MME 1202 of the EPC 1200) does not have sufficient amount of resources available for the UE 1002A, even when resources of other nodes have not been fully utilized.

The cloud-based wireless access infrastructure 2000 also has the advantage of enabling simplified network implementations relative to the conventional wireless access infrastructure 1000. Because the AP 2110 in the disclosed embodiments is configured to implement one or more eNodeB Functions and EPC Functions, which conventionally were not deployed at the same server, the AP may leverage optimizations that previously were not available, such as combining the implementations of one or more of the eNodeB Functions and EPC Functions. In the context of LTE, for example, optimizations that combine one or more base-station and/or core-network functions in the AP, or that enable other optimizations in terms of resource management and/or allocations, may provide simplified LTE network implementations that were previously not possible. More generally, the cloud-based wireless access solution herein may be advantageously used to simplify and optimize implementations of various types of wireless access networks and is not limited to LTE-based solutions.

Moreover, the capacity of the exemplary cloud-based wireless access infrastructure 2000 may be simpler and easier to scale up or down compared with the capacity of the conventional wireless access infrastructure 1000. For example, the capacity of the cloud-based wireless access infrastructure 2000 may be increased by adding more resources available to the cloud platform 2200 and/or to the AP 2110. In contrast, capacities of multiple EPC 1200 nodes may need to be increased to increase the capacity of the conventional wireless access infrastructure 1000.

According to the disclosed embodiments, the cloud portion 2214A of the service 2210A may be implemented on the cloud platform 2200. Examples of cloud platforms include, *Eucalyptus* (an open-source cloud platform), Open Stack (an open-source cloud platform), and Amazon Web Service (AWS). In some embodiments, the cloud portion 2214A of the service 2210A may be stateless and communicate with the distributed portion 2212A of the service 2210A using a protocol supported by the cloud platform 2200 (e.g., HTTP/REST and SOAP are supported by AWS). In some disclosed embodiments, the cloud portion 2214A of the service 2210A may utilize a cloud portion 2214B of another service 2210B. In other disclosed embodiments, a cloud portion 2214C of a service 2210C may communicate with a conventional core network node in IPX 2400 by a standardized interface. In some embodiments, the cloud portion 2214C of the service 2210C may communicate with a server/application (e.g., Enterprise identity and Authentication Application (EIAA) 2310) of the enterprise network 2300. And in some embodiments, the cloud portion 2214C of the service 2210C may communicate with the SDN controller 2500 to provide instructions on how and which network devices of the network devices 2150 to configure/reconfigure. In some embodiments, a service may have a cloud portion only (i.e., without corresponding distributed portions), such as the cloud portion 2114B of the service 2210B.

In some embodiments of the invention, the distributed portion 2212A of the service 2210A, in addition to exposing APIs to instances of eNodeB Functions 2112A-B and/or EPC Functions 2114A-B, may provide additional functions, such as caching. For example, when an API of the distribute portion 2212A of the service 2210A is being utilized to request data, the distributed portion 2212A, prior to communicating with its associated cloud portion 2214A to obtain the requested data, may determine whether the data is cached and/or whether the cached data is still valid.

Figure 4:
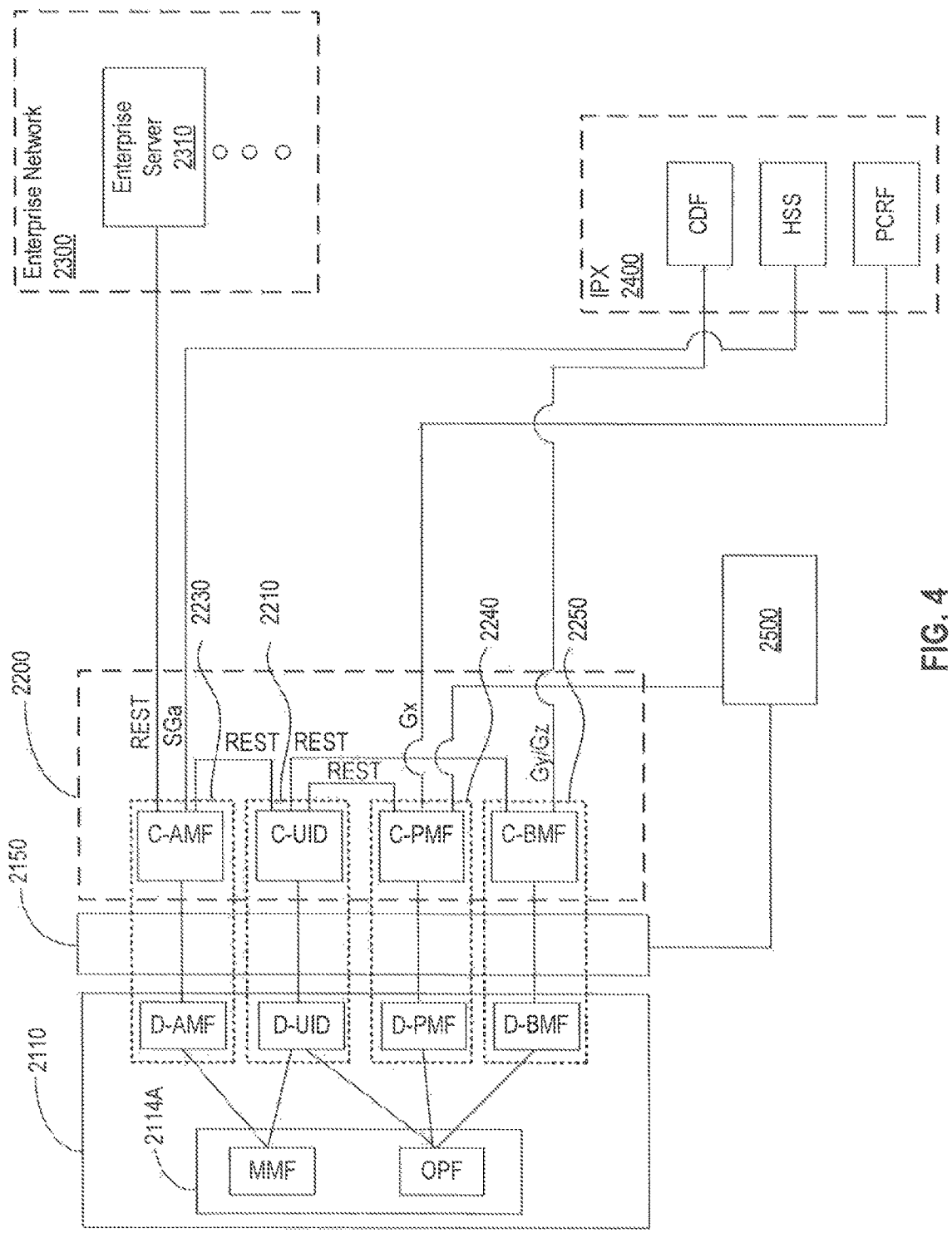
FIG. 4 illustrates a schematic block diagram of the exemplary cloud-based wireless access infrastructure of FIGS. 2 and 3 showing additional implementation details in accordance with the disclosed embodiments.

FIG. 4 illustrates a block diagram of the exemplary cloud-based wireless access infrastructure 2000 of FIGS. 2 and 3 in accordance with the disclosed embodiments. FIG. 4 illustrates additional implementation details that may be included in the exemplary cloud platform 2200, including various examples of services that may be used by instances of the EPC Functions 2114A-B. The exemplary services include, for example. User ID Service 2210, Operation, Administration, and Management Service 2220, Authorization Management Service 2230, and Policy Management Service 2240.

The Authorization Management Service 2230 may be configured to authenticate a UE 2120A by communicating with the EIAA 2310 and/or one or more authentication nodes (e.g., HSS nodes) of external carriers in the IPX 2400. As shown in FIG. 4, the Authorization Management Service 2230 may include a distributed portion ("D-AMF") and a corresponding cloud portion ("C-AMF"), which is configured to communicate with the D-AMF. In some embodiments, the D-AMF may be stateless and implemented as a software program executing in the AP 2110, separate from the instances of software program(s) executing for the EPC Functions 2114A-B and eNodeB Functions 2112A-B, but still accessible by at least some of the instances of EPC Functions and eNodeB Functions. In some embodiments, communications between the D-AMF and the C-AMF may be encrypted, for example, using TLS or IPSec.

In accordance with some embodiments, the Authorization Management Service 2230 may authenticate the UE 2120A by using authentication and key agreement procedures, such as Evolved Packet System Authentication and Key Agreement (EPS AKA) and/or XOR-based algorithms, which may create keying materials for the RRC (Radio Resource Control) signaling, NAS (Non-Access Stratum) signaling, ciphering keys, and integrity keys. An authentication and key agreement procedure may be initiated, for example, after an LTE ATTACH request from the UE 2120A.

In some embodiments, an LTE ATTACH request (the first step of an ATTACH procedure) may be sent from the U E 2120A to the AP 2110 when the UE 2120A is powered on and during the UE 2120A's initial access to the AP 2110. In some embodiments, the AP 2110 and the UE 2120A may use IMSI-based or GUTI-based ATTACH procedures, and an IP address (IPv4/IPv6) may be provided to the UE 2120A during the ATTACH procedure. In some embodiments, an instance of the eNodeB Function 2112A may forward information typically contained in an ATTACH Request message (as defined in the LTE standard) to the MMF of the corresponding instance of EPC Function 2114A. At least a portion of the information contained in the ATTACH Request message may be received from the UE 2120A. In some embodiments, the instance of the eNodeB Function 2112A may forward additional information such as the Selected Network, Tracking Area Identity (TAI), and EUTRAN Cell Global Identifier (ECGI) of the cell from where it received the message to the MMF of the corresponding instance of EPC Function 2114A.

As noted previously, the cloud platform 2200 may further include services having cloud portions only (i.e., without corresponding distributed portions), such as the cloud portion 2114B of the service 2210B. These services may include, for example, Integrated Authentication Management (IAM) Service, Skype Service, and Policy Service, and these types of services may communicate with other cloud portions of services. In some embodiments, the cloud platform 2200 may further include Emergency Management Service, Lawful Intercept Service, Roaming Management Service, and Paging Optimization Service, to provide additional examples.

Figure 5A:
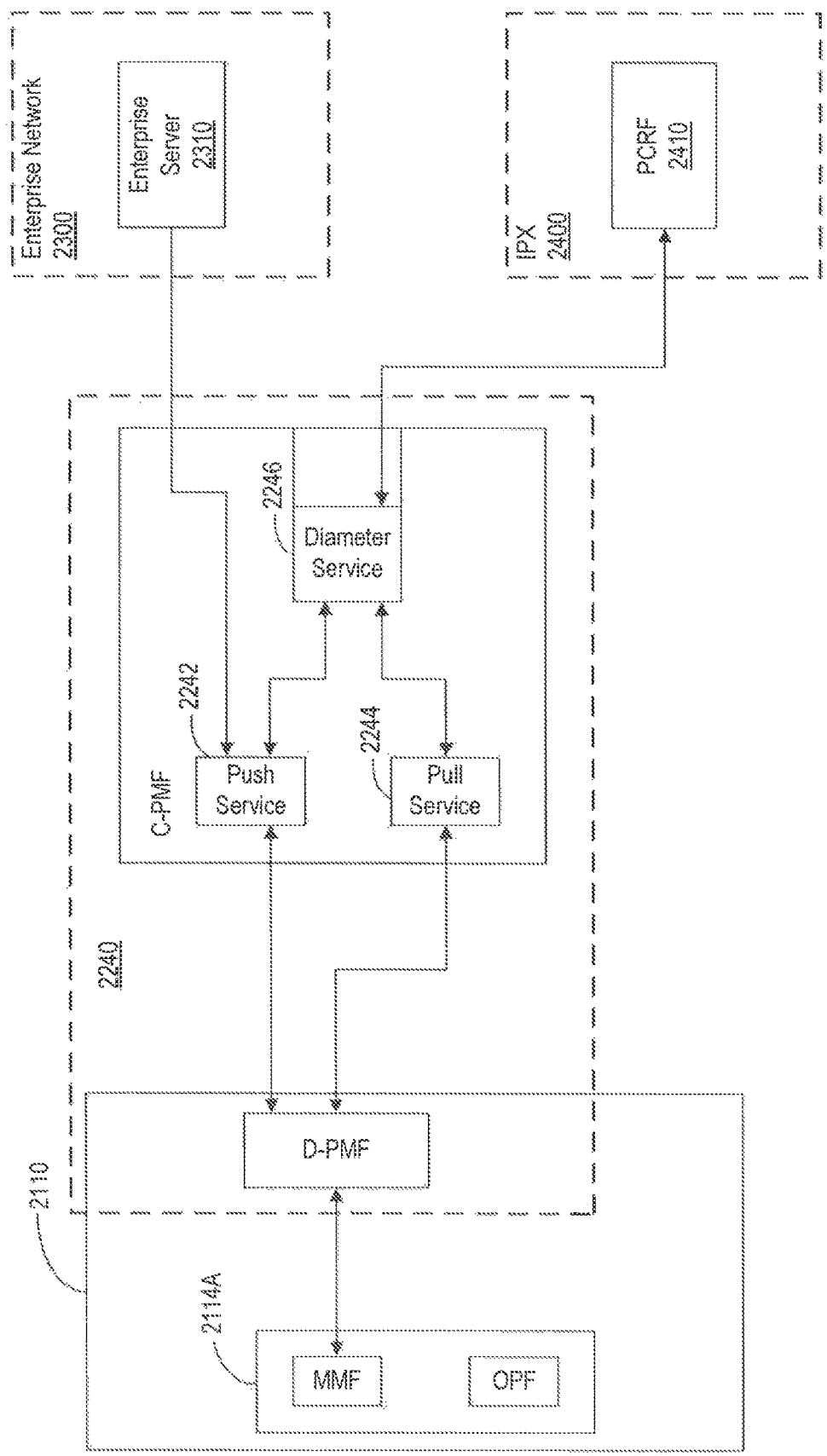
FIG. 5A illustrates schematic block diagram of exemplary Policy Management Services in accordance with the disclosed embodiments.

FIG. 5A illustrates exemplary Policy Management Service 2240 of FIG. 4 in accordance with the disclosed embodiments. The Policy Management Service 2240 may be configured to obtain one or more policy rules from one or more sources and communicate with other functions to enforce the obtained policy rules. Policy sources may include, for example, a PCRF 2410 node of a carrier network accessed via the IPX 2400 or an enterprise service/server, such as a directory service or VOIP service, accessed via Enterprise Network 2300. Similar to other services, the Policy Management Service 2240 may include a distributed portion ("D-PMF") and a corresponding cloud portion ("C-PMF").

In some embodiments, a UE may cause the Policy Management Service 2240 to retrieve (or "pull") the policy rules from policy sources and begin enforcing the retrieved policies. For example, a UE may initiate the retrieval of the policy rules by sending an ATTACH request to the MMF. After receiving the ATTACH process, the MMF may send a request to a pull service 2244 of the C-PMF such that the pull service 2244 retrieves the policy rules associated with the UE from various sources. After receiving the policy rules, the C-PMF may send the policy rules (or information derived from the retrieved policy rules) to the MMF that sent the request. Subsequently, the MMF may send the retrieved policy rules to the OPF assigned to the UE. In response to receiving the policy rules, the OPF may communicate with and configure the instance of the eNodeB Function 2112A assigned to the UE, and/or communicate with and cause SDN 2500 to configure one or more network devices 2150, based on the retrieved policy rules. In some embodiments, the policy rules may include traffic flow template (TFT), charging parameters associated with the UE, traffic shaping parameters, and/or packet filters. The MMF may accept the ATTACH request by sending the UE an ATTACH ACCEPT message.

Additionally, or alternatively, a policy source may send (e.g., push) a new or updated set of one or more policy rules to the Policy Management Service 2240, which causes enforcement of the new or updated rules. For example, a PCRF 2410 node of an external carrier network may send via the IPX 2400 new or updated policy rules associated with a UE to a push service 2242 of the C-PMF. The PCRF 2410 may send the policy rules periodically or after one or more rules are altered.

After receiving the updated policy rules, the C-PMF may forward the updated policy rules (or information derived from the updated policy rules) to the MMF of the AP associated with the UE. The C-PMF may query a lookup database to determine which AP is serving the UE, for example. Subsequently, the MMF may send the updated policy rules to the OPF of the instance of the EPC Function 2114A assigned to the UE. In response to receiving the updated policy rules, the OPF may communicate with and configure the instance of the eNodeB Function 2112A assigned to the UE and/or communicate with and cause SDN controller 2500 to configure one or more network devices 2150. After the configuration of various functions and/or network devices based on the updated policy rules, the MMF may send a message to the policy source via the push service 2242 of the C-PMF to confirm that the updated policies are being enforced.

Alternatively, or additionally, after receiving the updated policy rules from the PCRF 2410, the C-PMF may send at least a portion of the updated policy rules and/or instructions based on the updated policy rules to the SDN controller 2500. The SDN controller 2500, in turn, may configure one or more network devices 2150 based on the received policy rule and/or instructions. In one example, the SDN controller 2500 may instruct one or more of the network devices 2150 (e.g., routers and switches) to give priority to packets and frames that originates/destined from/for a particular UE.

In some embodiments, the policy source may be a VOIP service (e.g., Skype for Business) that pushes a policy rule containing quality of service parameters. In some embodiments, the quality of service parameters may include parameters for providing one or more users of the VOIP service with a priority access to the network (e.g., for a better call quality). The push process may be initiated when a user of the VOIP service initiates a call. Additionally, or alternatively, another push process may be initiated to restore the old quality of service parameters when the call is terminated.

In some embodiments, the C-PMF may further include one or more diameter services 2246. Each diameter service 2246 may be configured to communicate with a node of an external carrier network (e.g., through the IPX 2400) using, for example, a standardized LTE interface protocol. For example, the C-PMF may include a diameter service 2246 that communicates with a PCRF 2410 node using the S9 interface protocol. Additionally, or alternatively, the C-PMF may further include another diameter service that communicates with a PCRF 2410 node using the Gx interface protocol.

Figure 5B:
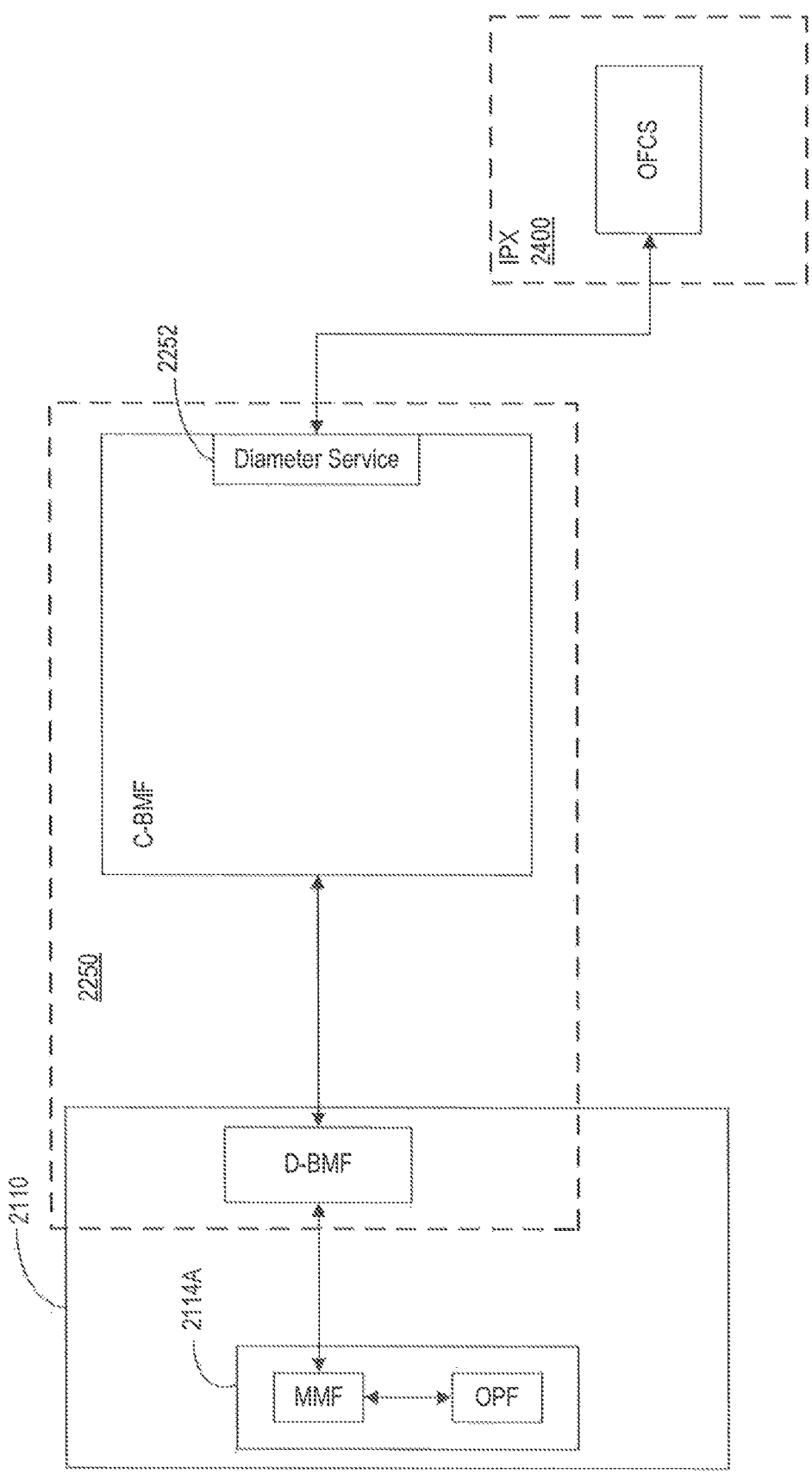
FIG. 5B illustrates a schematic block diagram of exemplary Billing Management Services in accordance with the disclosed embodiments.

FIG. 5B illustrates an exemplary Billing Management Service 2250 in accordance with the disclosed embodiments. The Billing Management Service 2250 includes a distributed portion ("D-BMF") and a corresponding cloud portion ("C-BMF"), and may provide online and/or offline charging capabilities to an instance of the EPC Function 2114A. For example, an instance of the EPC Function 2114A may use APIs in the D-BMF to request the C-BMF to determine whether a UE 2120A is authorized to use a network resource based on, for example, the user's account information (e.g., amount of data and minutes pre-paid by the user of the UE 2120A) or the user's network usage information (e.g., the amount of data or minutes currently used by the UE 2120A).

In some embodiments, the C-BMF may receive the account information from the cloud portion of the User ID Service 2210, using for example HTTP/REST. In another example, an instance of the EPC Function 2114A may use APIs in the D-BMF to send the C-BMF information relating to the UE 2120A's network usage. In some embodiments, the C-BMF may transfer this information to an internal Billing Domain for the purposes of billing the user of the UE 2120A, updating inter-operator accounting, and/or monitoring usage of network resources. In some embodiments, the C-BMF may send and/or receive network usage information to/from another carrier such that the UE 2120A's internal and external network usage may be tracked and/or controlled. In some embodiments, the C-BMF may communicate with a Charge Data Function (CDF) node of the carrier's EPC 1200 network through the IPX 2400, for example, using standardized LTE interfaces Gy and Gz.

In the exemplary Billing Management Service 2250 of FIG. 5B, an offline charging capability is provided by the Billing Management Service 2250. For example, after an ATTACH request is received by the MMF from a UE, the MMF requests the C-BMF to retrieve charging-related configuration information associated with the UE. The charging-related configuration information may be locally stored at the C-BMF or, alternatively, the C-BMF may retrieve charging-related configuration information associated with the UE from an external source such as an Offline Charging System (OFCS) or Online Charging Scheme (OCS) accessed via the IPX 2400. In some embodiments, the C-BMF may include a diameter service 2252 configured to communicate with the external nodes using a standardized interface protocol, such as the Gz interface protocol, and the C-BMF may retrieve the charging-related configuration information using the diameter service 2252. After receiving the charging-related configurations, the C-BMF may forward the charging-related configuration information to the MMF, and the MMF may provide at least some of the configuration information to the OPF. The OPF may measure accounting data based on the received charging-related configuration information. For example, the OPF may measure the amount of data transmitted and received by the UE and/or the amount of time the UE is attached to the network. In some embodiments, the OPF may provide interim updates (e.g., usage data) to the C-PMF. After the OPF begins measuring the accounting data, the MMF may accept the ATTACH request sent by the UE by sending an ATTACH ACCEPT message to the UE.

Figure 6A:
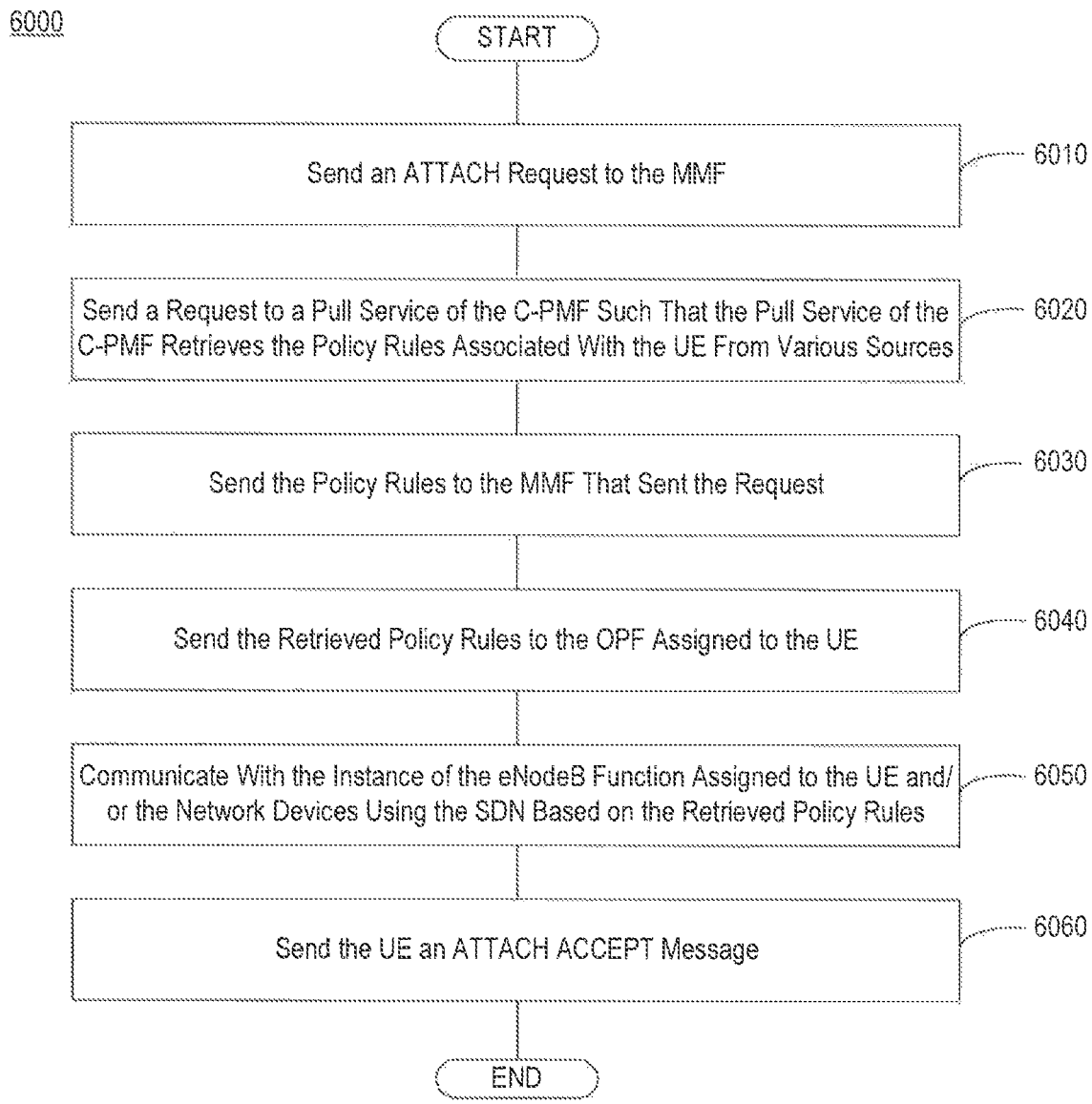
FIGS. 6A-C are flow diagrams of processes for obtaining policy rules in accordance with the disclosed embodiments.

FIG. 6A is a flow diagram of an exemplary process 6000 for obtaining policy rules according to the disclosed embodiments. At step 6010, a UE may send send an ATTACH request to the MMF. At step 6020, the MMF may send a request to a pull service 2244 of the C-PMF such that the pull service 2244 of the C-PMF retrieves one or more policy rules associated with the U E from at least one source. At step 6030, the C-PMF may send the policy rules (or information derived from the retrieved policy rules) to the MMF that sent the request. At step 6040, the MMF may send the retrieved policy rules to the OPF assigned to the UE. At step 6050, the OPF may communicate with and configure the instance of the eNodeB Function 2112A assigned to the UE and/or use SDN 2500 to configure one or more network devices 2150 based on the retrieved policy rules. In some embodiments, the policy rules may include traffic flow template (TFT), charging parameters associated with the UE, traffic shaping parameters, and/or packet filters. At step 6060, the MMF may accept the ATTACH request by sending the UE an ATTACH ACCEPT message.

Figure 6B:
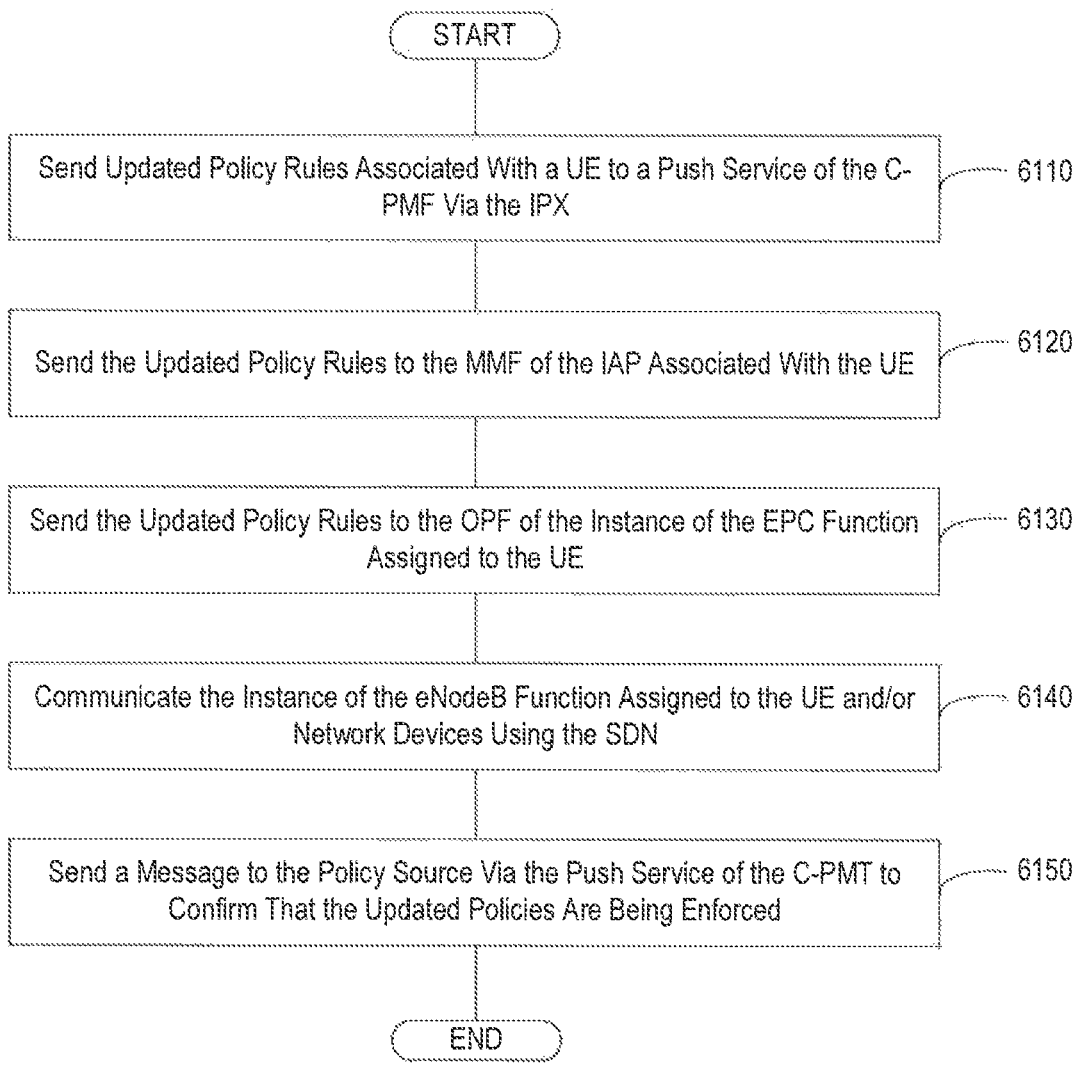

FIG. 6B is a flow diagram of another exemplary process 6100 for obtaining policy rules according to the disclosed embodiments. At step 6110, a PCRF 2410 node of an external carrier network may send a set of one or more new or updated policy rules associated with a UE to a push service 2242 of the C-PMF via the IPX 2400. At step 6120, the C-PMF may send the updated policy rules (or information derived from the updated policy rules) to the MMF of the AP associated with the UE. In some embodiments, the C-PMF may query a lookup database to determine which AP is serving the UE, for example. In some embodiments, the C-PMF may send at least a portion of the updated policy rules or an instructions based on the updated policy rules to the SDN 2500 and cause the SDN 2500 to configure one or more network devices 2150. At step 6130, the MMF may send the updated policy rules to the OPF of the instance of the EPC Function 2114A assigned to the UE. At step 6140, the OPF may communicate with and configure the instance of the eNodeB Function 2112A assigned to the UE and/or use SDN 2500 to configure network devices 2150. At step 6150, the MMF may send a message to the policy source via the push service 2242 of the C-PMF to confirm that the updated policies are being enforced.

Figure 6C:
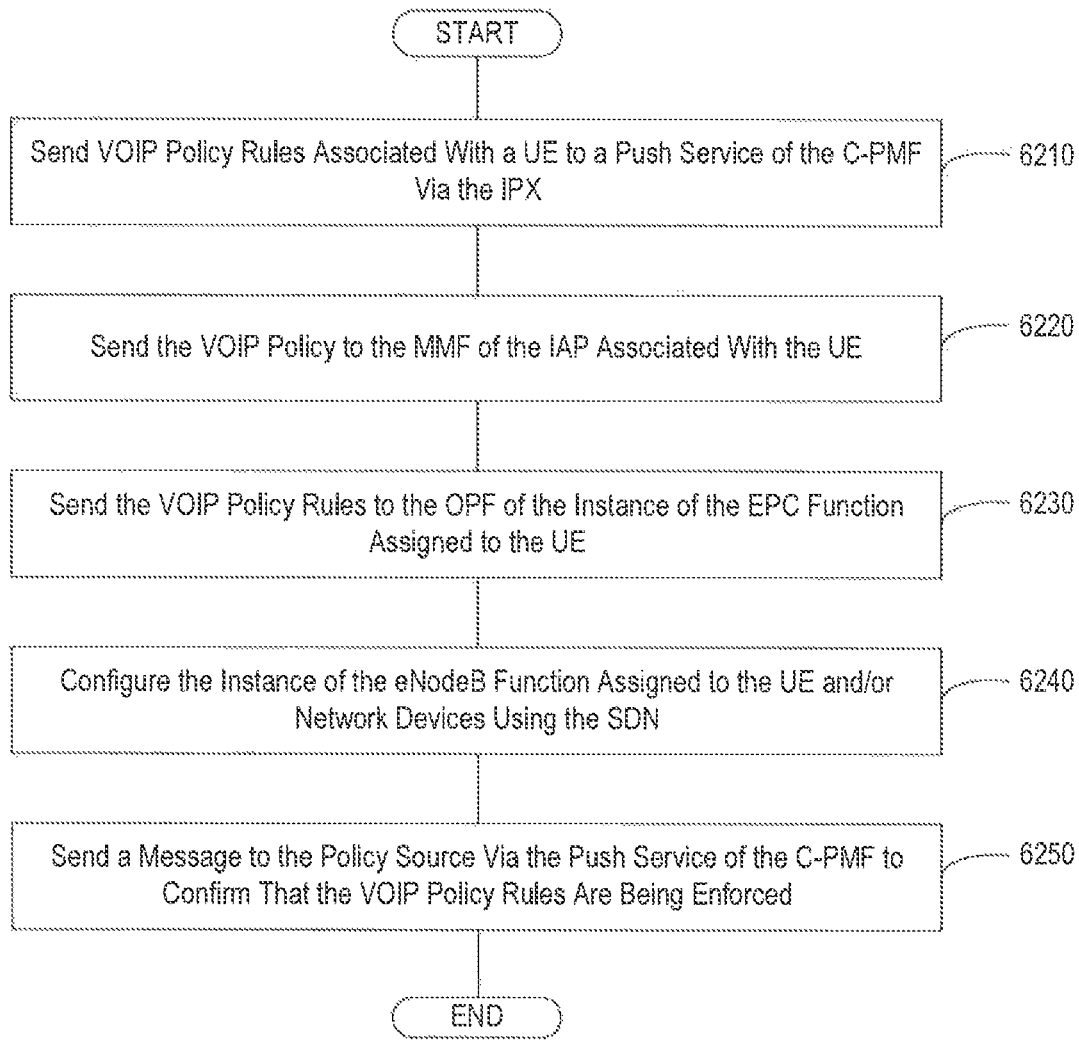

FIG. 6C is a flow diagram of another exemplary process 6200 for obtaining policy rules according to the disclosed embodiments. At step 6110, an enterprise server/service may send VOIP policy rules associated with a UE to a push service 2242 of the C-PMF via the IPX 2400. In some embodiments, the enterprise server/service may send one or more VOIP policy rules, for example using the REST protocol. In some embodiments, the enterprise server may be a VOIP server such as a Skype for Business server. At step 6120, the C-PMF may send the VOIP policy rules (or information derived from the VOIP policy rules) to the MMF of the AP associated with the UE. In some embodiments, the C-PMF may query a lookup database to determine which AP is serving the UE, for example. At step 6130, the MMF may send the VOIP policy rules to the OPF of the instance of the EPC Function 2114A assigned to the UE.

At step 6140, the OPF may communicate with and configure the instance of the eNodeB Function 2112A assigned to the UE and/or use SDN 2500 to configure one or more network devices 2150. If the UE is starting a call, the OPF may configure the instance of the eNodeB Function 2112A assigned to the UE and/or use SDN 2500 to configure network devices 2150 to provide higher quality of service for the UE. If the UE is terminating a call, the OPF may configure the instance of the eNodeB Function 2112A assigned to the UE and/or use SDN 2500 to configure network devices 2150 to restore the original quality of service for the UE (prior to starting the call). At step 6150, the MMF may send a message to the policy source via the push service 2242 of the C-PMF to confirm that the updated policies are being enforced.

Figure 7:
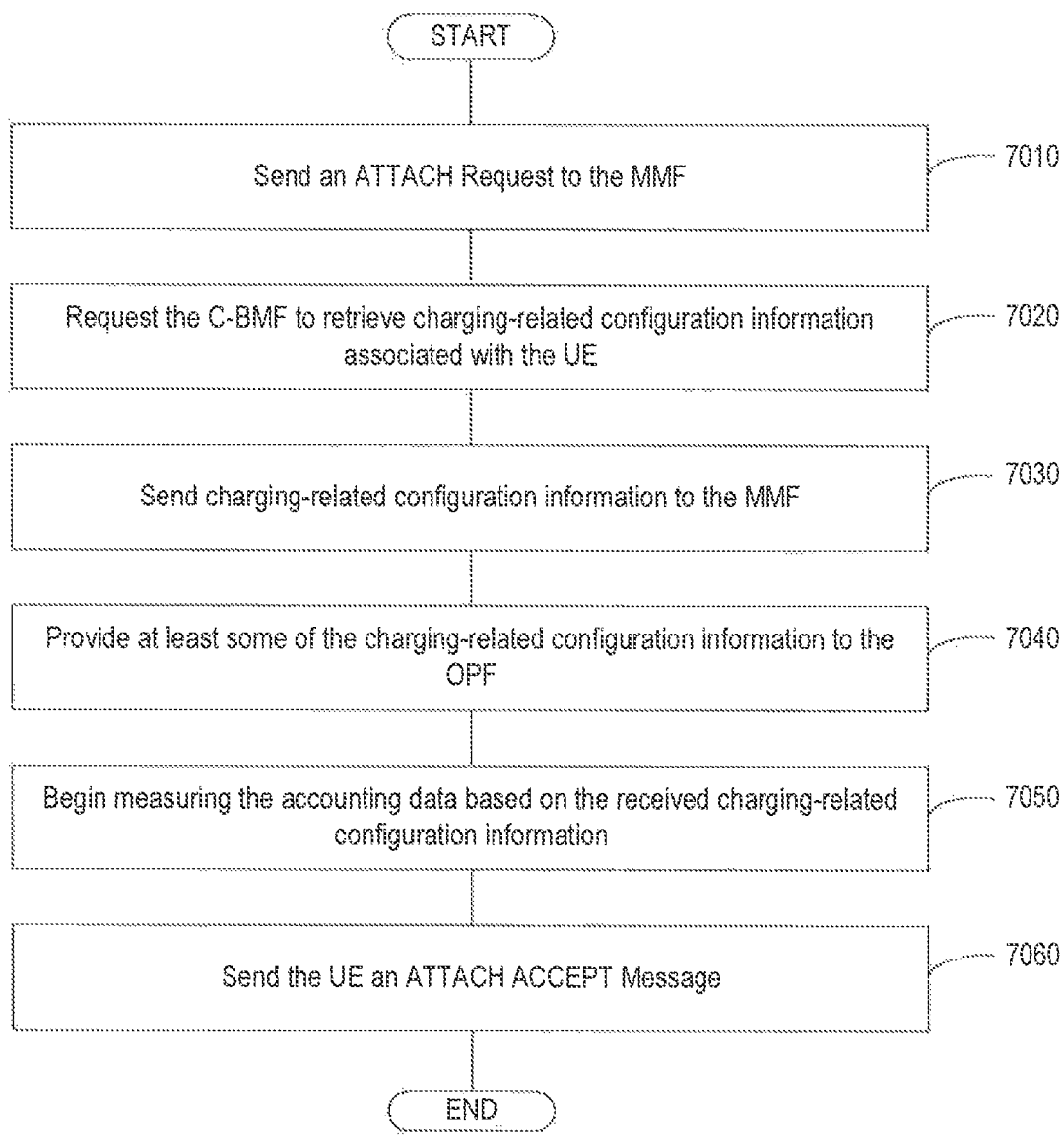
FIG. 7 is a flow diagram of a process for providing billing-related functions in accordance with the disclosed embodiments.

FIG. 7 is a flow diagram of exemplary process 7000 for providing charging functions according to the disclosed embodiments. At step 7010, a UE may send an ATTACH request to the MMF from a UE. At step 7020, the MMF may request the C-BMF to retrieve charging-related configuration information associated with the UE. The charging-related configurations may be locally stored at the C-BMF or, alternatively, the C-BMF may retrieve charging-related configurations associated with the UE from an external node such as an OFCS and/or OCS. In some embodiments, the C-BMF may include a diameter service 2252 configured to communicate with the external nodes using a standardized interface protocol, and the C-BMF may retrieve the charging-related configurations using the diameter service 2252.

At step 7030, the C-BMF may send charging-related configuration information (e.g., or charging information derived therefrom) to the MMF. At step 7040, the MMF may provide at least some of the charging-related configuration information to the OPF. At step 7050, the OPF may begin measuring the accounting data based on the received charging-related configuration information. As noted above, for example, the OPF may measure the amount of data transmitted and received by the UE and/or the amount of time the UE is attached to the network. In some embodiments, the OPF may provide interim updates (e.g., usage data) to the C-PMF. At step 7060, the MMF may accept the ATTACH request sent by the UE by sending an ATTACH ACCEPT message to the UE.

Figure 8:
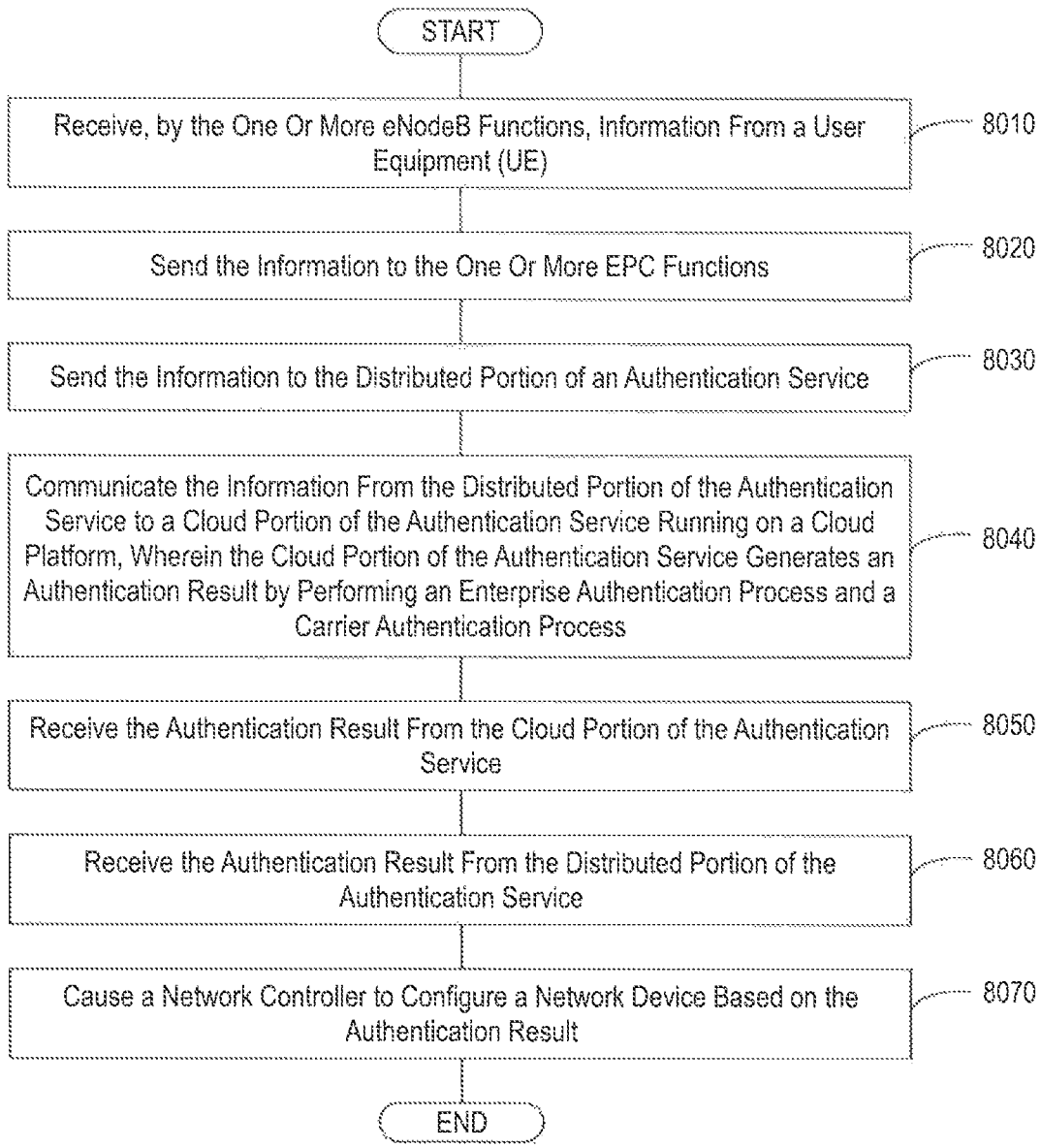
FIG. 8 is a flow diagram illustrating a sequence of steps that may be performed by an AP in accordance with the disclosed embodiments.

FIG. 8 is a flow diagram of a process 8000 performed by an AP 2110 in accordance with the disclosed embodiments. The AP 2110 may execute a set of one or more base-station functions for use by a UE, a set of one or more core-network functions, and a distributed portion of a service. At step 8010, the set of one or more base-station functions may receive information from the UE. At step 8020, the set of one or more core-network functions may receive the information from the set of one or more base-station functions. At step 8030, the distributed portion of the service may receive the information from the one or more core-network functions. At step 8040, the distributed portion of the service may communicate the information to a corresponding cloud portion of the service running on a cloud platform 2200. In some embodiments, the service may be provided by a combination of the distributed portion and the cloud portion of the service. At step 8050, the distributed portion of the service may receive a response from the cloud portion of the service based on processing performed by the cloud portion on the cloud platform.

Further to the disclosed embodiments of the invention, the cloud-based wireless access infrastructure 2000 may establish each user's connection to the wireless access infrastructure as an end-to-end set of resources across multiple functional layers. For example, an instance of eNodeB Function 2112A in the AP 2110 may use services to implement the air interface layers (e.g., PHY and MAC layers) and radio access layer (e.g., RRM), and the MMF and the OPF of an instance of the EPC Function 2114A, and may further use services to implement an enterprise network layer, cloud resource layer, and enterprise application layer. This connected set of resources across multiple layers representing a UE's wireless connectivity may enable configuration of the network devices 2150 to provide different QoS and ranges of services for each user, handling mobility of the user across dissimilar wireless networks, and other desired infrastructure behavior configured on a per-user basis.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A controller in a cloud-based wireless access infrastructure, the cloud-based wireless access infrastructure including one or more network devices and at least one user equipment (UE) configured to communicate in the cloud-based wireless access infrastructure, the controller comprising:
   a memory configured to store software instructions for execution by at least one processor; and
   at least one processor configured to execute the software instructions to configure the one or more network devices to provide an end-to-end set of resources across multiple functional layers from an enterprise application layer to a radio access layer for a connection between the at least one UE and the cloud-based wireless access infrastructure.

2. The controller of claim 1, wherein the controller comprises a software defined network (SDN) controller.

3. The controller of claim 1, wherein the controller is further configured to receive one or more instructions to configure the one or more network devices from a cloud portion of a service in the cloud-based wireless access infrastructure, wherein the service is provided by a combination of the cloud portion of the service and a corresponding distributed portion of the service.

4. The controller of claim 3, wherein the distributed portion of the service is implemented on an access point in the cloud-based wireless access infrastructure.

5. The controller of claim 1, wherein the multiple functional layers further comprise at least one of an air interface layer, an enterprise network layer, or a cloud resource layer.

6. The controller of claim 5, wherein the air interface layer comprises at least one of a physical (PHY) layer or a media access control (MAC) layer.

7. The controller of claim 5, wherein the radio access layer comprises a radio resource management (RRM) layer.

8. The controller of claim 1, wherein the end-to-end set of resources across multiple functional layers represents the at least one UE's wireless connectivity in the cloud-based wireless access infrastructure.

9. The controller of claim 1, wherein the end-to-end set of resources across multiple functional layers is configured to provide a desired infrastructure behavior configured on a per-user basis.

10. The controller of claim 9, wherein the infrastructure behavior comprises a quality of service (QoS) for at least one user of the at least one UE.

11. The controller of claim 1, wherein the one or more network devices comprise at least one of a hub, a switch, or a router in the cloud-based wireless access infrastructure.

12. A method performed by a controller in a cloud-based wireless access infrastructure, the cloud-based wireless access infrastructure including one or more network devices and at least one user equipment (UE) configured to communicate in the cloud-based wireless access infrastructure, the method comprising:
   receiving one or more instructions to configure the one or more network devices from a cloud portion of a service in the cloud-based wireless access infrastructure, wherein the service is provided by a combination of the cloud portion of the service and a corresponding distributed portion of the service; and
   configuring the one or more network devices based on the one or more received instructions to provide an end-to-end set of resources across multiple functional layers from an enterprise application layer to a radio access layer for a connection between the at least one UE and the cloud-based wireless access infrastructure.

13. The method of claim 12, wherein the controller comprises a software defined network (SDN) controller.

14. The method of claim 12, wherein the distributed portion of the service is implemented on an access point in the cloud-based wireless access infrastructure.

15. The method of claim 12, wherein the multiple functional layers further comprise at least one of an air interface layer, an enterprise network layer, or a cloud resource layer.

16. The method of claim 12, wherein the end-to-end set of resources across multiple functional layers represents the at least one UE's wireless connectivity in the cloud-based wireless access infrastructure.

17. The method of claim 12, wherein the end-to-end set of resources across multiple functional layers is configured to provide a desired infrastructure behavior configured on a per-user basis.

18. The method of claim 12, wherein the infrastructure behavior comprises a quality of service (QoS) for at least one user of the at least one UE.

19. A cloud-based wireless access infrastructure, comprising:
   a cloud platform running a cloud portion of a service;
   an access point configured to communicate with at least one user equipment (UE) and with the cloud platform, the access point comprising a distributed portion of a service, wherein the service is provided by a combination of the distributed portion and the cloud portion of the service; and
   one or more network devices through which the distributed portion and the cloud portion of the service communicate for one or more user connections from the at least one UE to the cloud-based wireless access infrastructure, wherein the one or more network devices are configurable to provide an end-to-end set of resources across multiple functional layers from an enterprise application layer to a radio access layer for the one or more user connections to the cloud-based wireless access infrastructure.

20. The cloud-based wireless access infrastructure of claim 19, wherein the one or more network devices are configurable based on instructions from the cloud portion of the service.

21. The cloud-based wireless access infrastructure of claim 19, wherein the cloud-based wireless access network further comprises a software defined network (SDN) controller, wherein the one or more network devices are configurable by the SDN controller.

* * * * *